United States Patent
Yagi et al.

(10) Patent No.: US 12,117,283 B2
(45) Date of Patent: Oct. 15, 2024

(54) INSPECTION DEVICE, METHOD FOR PRODUCING MULTILAYER ELECTRODE BODY AND INSPECTION METHOD

(71) Applicant: Panasonic Holdings Corporation, Osaka (JP)

(72) Inventors: Haruhisa Yagi, Osaka (JP); Ryuta Abe, Osaka (JP); Tatsuya Masada, Hyogo (JP)

(73) Assignee: Panasonic Holdings Corporation, Osaka (JP)

( * ) Notice: Subject to any disclaimer, the term of this patent is extended or adjusted under 35 U.S.C. 154(b) by 242 days.

(21) Appl. No.: 17/800,144

(22) PCT Filed: Feb. 4, 2021

(86) PCT No.: PCT/JP2021/004059
§ 371 (c)(1),
(2) Date: Aug. 16, 2022

(87) PCT Pub. No.: WO2021/171946
PCT Pub. Date: Sep. 2, 2021

(65) Prior Publication Data
US 2023/0075603 A1    Mar. 9, 2023

(30) Foreign Application Priority Data
Feb. 28, 2020 (JP) .................. 2020-033252

(51) Int. Cl.
*G01B 11/00* (2006.01)
*H01M 10/04* (2006.01)
*H01M 50/46* (2021.01)

(52) U.S. Cl.
CPC ....... *G01B 11/002* (2013.01); *H01M 10/0404* (2013.01); *H01M 10/0413* (2013.01); *H01M 50/461* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 10,684,128 B2 * | 6/2020 | Sopori ................ | G01B 21/085 |
| 2014/0020235 A1 * | 1/2014 | Aramaki ............. | H01M 4/139 |
| | | | 29/730 |

(Continued)

FOREIGN PATENT DOCUMENTS

JP    2012-221713 A    11/2012

OTHER PUBLICATIONS

International Search Report issued in corresponding International Application No. PCT/JP2021/004059, dated Apr. 13, 2021, with English translation.

*Primary Examiner* — Edwin C Gunberg
(74) *Attorney, Agent, or Firm* — Rimon P.C.

(57) ABSTRACT

An inspection device is a device that inspects the position of an electrode plate in a multilayer body, which is obtained by bonding a separator and the electrode plate to each other by means of an adhesive, from the separator side. This inspection device is provided with: an infrared light irradiation unit that irradiates the multilayer body, from the separator side, with infrared light that has a peak wavelength within the range of from 6.5 μm to 9.6 μm; a camera that takes an image of the infrared light that transmits through the separator and is reflected by the electrode plate; and a detection unit that detects the position of the electrode plate.

8 Claims, 10 Drawing Sheets

(56) References Cited

U.S. PATENT DOCUMENTS

2015/0177313 A1\* 6/2015 Hoelter ................ G01J 5/0808
  324/754.21
2022/0020114 A1\* 1/2022 George ............. G01N 21/8806

\* cited by examiner

| WAVELENGTH (μm) | 9.6 | 9.3 | 9.2 | 9.0 | 8.9 | 8.7 | 6.5 |
|---|---|---|---|---|---|---|---|
| ILLUMINATION RADIATION SURFACE TEMPERATURE (°C) | 30 | 38.6 | 43.2 | 49.2 | 53.9 | 60.9 | 140.0 |
| UNIT MULTILAYER BODY SURFACE TEMPERATURE (°C) | 26.1 | 26.2 | 26.3 | 26.3 | 26.4 | 26.5 | 28.0 |
| IMAGE | | | | | | | |
| OCCURRENCE OF SEPARATOR PEELING | NO | NO | NO | NO | NO | NO | NO |

INSPECTION DEVICE, METHOD FOR PRODUCING MULTILAYER ELECTRODE BODY AND INSPECTION METHOD

CROSS-REFERENCE TO RELATED APPLICATIONS

This application is the U.S. National Phase under 35 U.S.C. § 371 of International Patent Application No. PCT/JP2021/004059, filed on Feb. 4, 2021, which in turn claims the benefit of Japanese Patent Application No. 2020-033252, filed on Feb. 28, 2020, the entire content of each of which is incorporated herein by reference.

BACKGROUND

Field of the Invention

The present disclosure relates to an inspection device, a device for producing a multilayer electrode body, and an inspection method.

Description of the Related Art

In recent years, shipments of in-vehicle secondary batteries have been increasing with the spread of electric vehicles (EV), hybrid vehicles (HV), plug-in hybrid vehicles (PHV), and the like. In particular, shipments of lithium-ion secondary batteries are increasing. Further, secondary batteries are becoming widespread not only for in-vehicle use but also as a power source for portable terminals such as laptop computers. As such secondary batteries, stack-type batteries are known. Generally, a stack-type battery has a structure where a multilayer electrode body in which a plurality of positive electrode plates and a plurality of negative electrode plates are alternately stacked with a separator interposed therebetween is housed in an outer can along with an electrolytic solution.

One method of forming a multilayer electrode body is to sequentially stack unit multilayer bodies consisting of two electrode plates and two separators. The unit multilayer bodies have a structure in which the electrode plates and separators are alternately stacked and the four layers are bonded by an adhesive. In this method, it is required to minimize misalignment of each electrode plate when sequentially stacking the unit multilayer bodies. This is because misalignment of each electrode plate can hinder the performance improvement of secondary batteries. For example, if a positive electrode plate sticks out of a negative electrode plate, repeated charging and discharging may cause deposition of lithium, resulting in electrical defects such as short circuits.

Therefore, it is desirable to inspect the position of an electrode plate in a stacked unit multilayer body during a stacking process of the unit multilayer body. Regarding this, Patent Literature 1 discloses an electrode position detector that projects infrared light, which passes through a separator but not passes through an electrode, to an electrode arranged in a separator formed in a bag shape such that a camera receives infrared light reflected by the electrode so as to detect the position of the electrode.

Patent Literature 1: Japanese Patent Application Publication No. 2012-221713

In conventional detection devices, the adhesive strength of an adhesive may decrease due to the heat of infrared light emitted on unit multilayer bodies. A decrease in the adhesive strength of the adhesive may cause the separator to become peeled off exposing the electrode plate or form wrinkles on the separator or the electrode plate. Such exposure and wrinkling can cause defects such as short circuits, uneven electrolyte impregnation, and the like.

SUMMARY OF THE INVENTION

In this background, a purpose of the present disclosure is to provide a technique for detecting the position of an electrode plate while suppressing the degradation of adhesive strength of separators and electrode plates.

One aspect of the present disclosure relates to an inspection device that inspects the position of an electrode plate in a multilayer body, which is obtained by bonding a separator and the electrode plate to each other by means of an adhesive, from the separator side. This inspection device includes: an infrared light irradiation unit that irradiates the multilayer body from the separator side with infrared light that has a peak wavelength within the range of from 6.5 µm to 9.6 µm; a camera that has a sensitivity within the wavelength range of the infrared light and takes an image of the infrared light that transmits through the separator and is reflected by the electrode plate; and a detection unit that detects the position of the electrode plate on based on the image taken by the camera.

Another aspect of the present disclosure relates to a device for producing a multilayer electrode body. This production device according to the above aspect includes: a stacking stage on which a multilayer body in which a separator and an electrode plate are bonded with an adhesive is stacked; a conveyance unit that conveys the multilayer body and releases the multilayer body onto the stacking stage; and an inspection device of the above-described embodiment that inspects the position of the electrode plate in the multilayer body released from the conveyance unit, wherein the device stacks the multilayer body so as to produce a multilayer electrode body.

Another aspect of the present disclosure relates to an inspection method for inspecting the position of an electrode plate in a multilayer body, which is obtained by bonding a separator and the electrode plate to each other by means of an adhesive, from the separator side. This inspection method includes: irradiating the multilayer body from the separator side with infrared light that has a peak wavelength within the range of from 6.5 µm to 9.6 µm; by a camera that has a sensitivity within the wavelength range of the infrared light, taking an image of the infrared light that transmits through the separator and is reflected by the electrode plate; and detecting the position of the electrode plate based on the image taken by the camera.

Optional combinations of the aforementioned constituting elements, and implementations of the present disclosure in the form of methods, apparatuses, and systems may also be practiced as additional modes of the present disclosure.

1.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 9 is a diagram showing the result of Verification Test I;

DETAILED DESCRIPTION OF THE INVENTION

Figure 1:
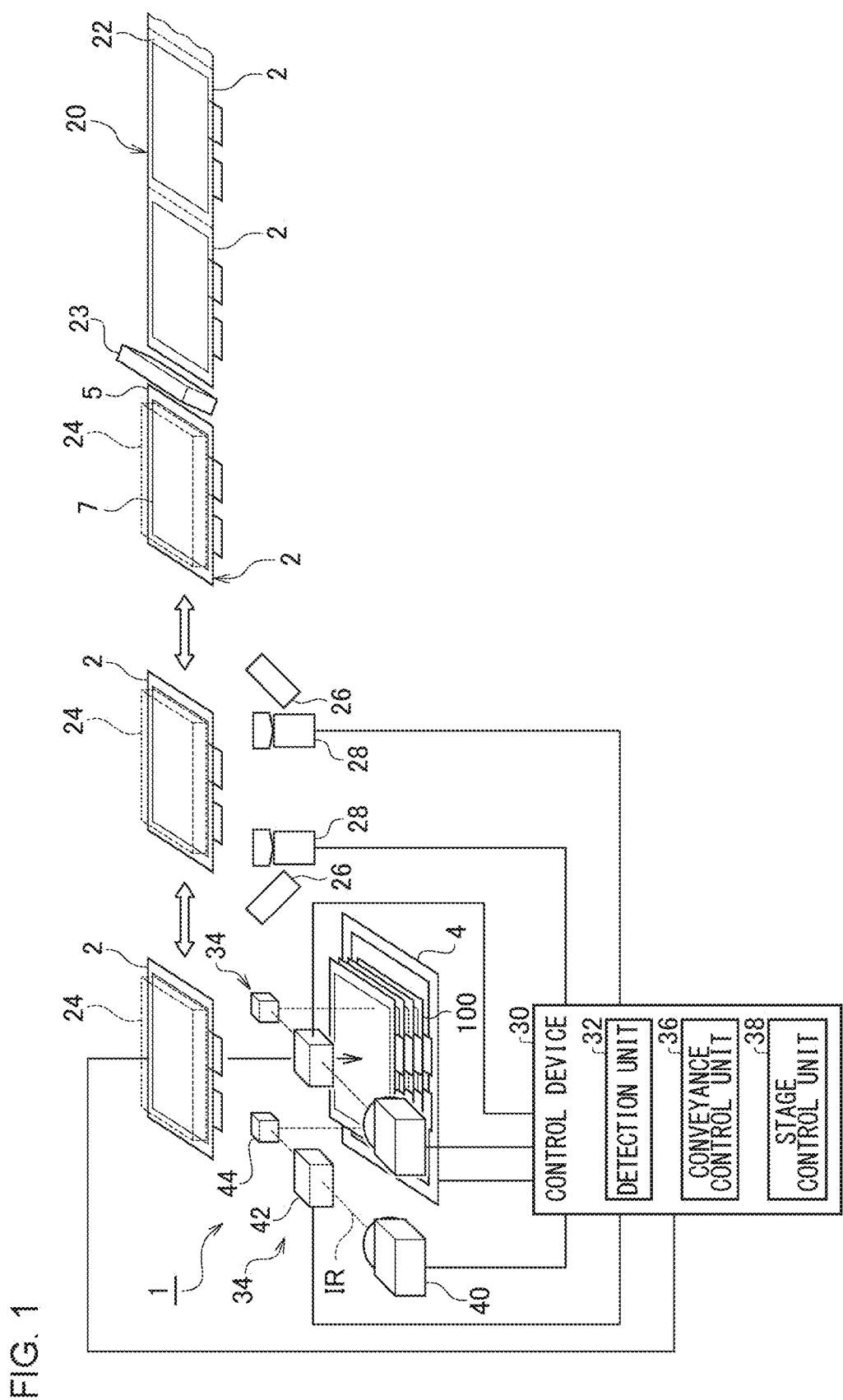
FIG. 1 is a schematic diagram of a production line including a device for producing a multilayer electrode body according to an embodiment.

Hereinafter, the present disclosure will be described based on a preferred embodiment with reference to the figures. Further, the embodiments do not limit the present disclosure and are shown for illustrative purposes, and not all the features described in the embodiments and combinations thereof are necessarily essential to the present disclosure. The same or equivalent constituting elements, members, and processes illustrated in each drawing shall be denoted by the same reference numerals, and duplicative explanations will be omitted appropriately.

The scales and shapes shown in the figures are defined for convenience's sake to make the explanation easy and shall not be interpreted limitatively unless otherwise specified. Terms like "first", "second", etc., used in the specification and claims do not indicate an order or importance by any means unless specified otherwise and are used to distinguish a certain feature from the others. Some of the components in each figure may be omitted if they are not important for explanation.

First Embodiment

Figure 2A:
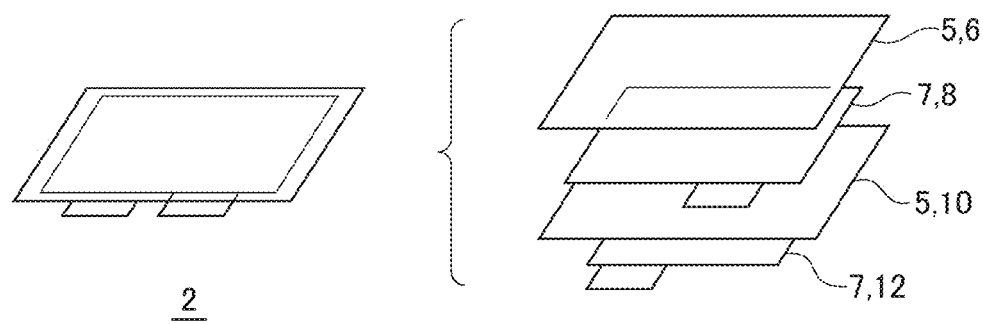
FIG. 2A is a schematic diagram of a unit multilayer body having a four-layer structure.
Figure 2B:
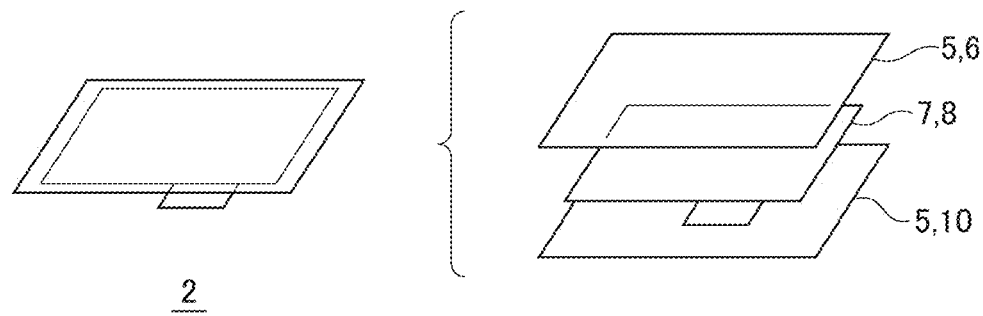
FIG. 2B is a schematic diagram of a unit multilayer body having a three-layer structure.
Figure 3A:
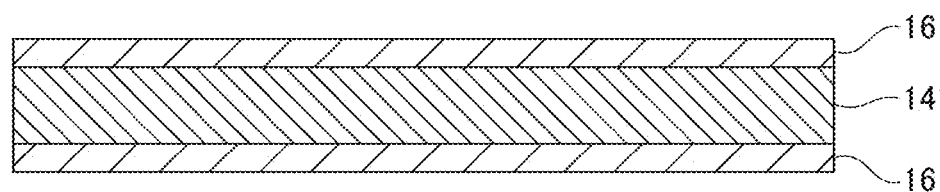
FIG. 3A and FIG. 3B are separator cross-sectional diagrams.
Figure 3B:
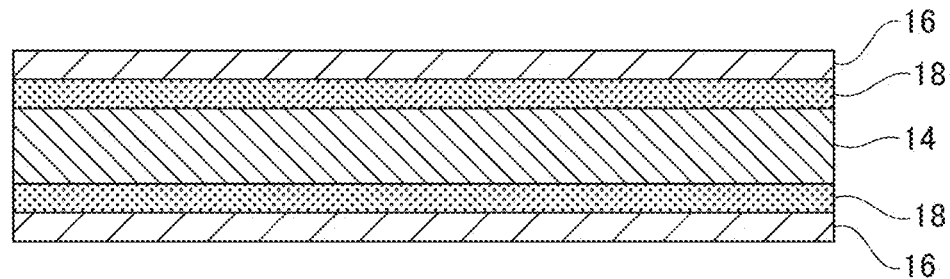

FIG. 1 is a schematic diagram of a production line including a device for producing a multilayer electrode body according to an embodiment. FIG. 2A is a schematic diagram of a unit multilayer body having a four-layer structure. FIG. 2B is a schematic diagram of a unit multilayer body having a three-layer structure. A unit multilayer body in each figure is illustrated with a separator that is being seen through. FIG. 3A and FIG. 3B are separator cross-sectional diagrams.

A production device 1 for producing a multilayer electrode body 100 is a device that produces the multilayer electrode body 100 by stacking a unit multilayer body 2 (multilayer body) on a stacking stage 4. The multilayer electrode body 100 is composed of, for example, thirty to forty unit multilayer bodies 2. The multilayer electrode body 100 that is obtained is used, for example, in a lithium-ion secondary battery. Examples shown as the unit multilayer bodies 2 include those having a four-layer structure shown in FIG. 2A and those having a three-layer structure as shown in FIG. 2B.

A unit multilayer body 2 having a four-layer structure has a structure in which two separators 5 and two electrode plates 7 are stacked and bonded by an adhesive. More specifically, a first separator 6, a first electrode plate 8, a second separator 10, and a second electrode plate 12 are lined up in this order from the top. A unit multilayer body 2 having a three-layer structure has a structure in which two separators 5 and one electrode plate 7 are stacked and bonded by an adhesive. More specifically, a first separator 6, a first electrode plate 8, and a second separator 10 are lined up in this order from the top. In the present embodiment, the first electrode plate 8 is a negative electrode plate, and the second electrode plate 12 is a positive electrode plate. In the following, when it is not necessary to distinguish between the first and second electrode plates 8 and 12, the electrode plates will be referred to collectively as electrode plates 7, and when it is not necessary to distinguish between the first separator 6 and the second separator 10, the separators will be referred to collectively as separators 5.

A positive electrode plate has a positive electrode current collector and a positive electrode active material layer. The positive electrode active material layer is stacked on both sides or one side of the positive electrode current collector. Both the positive electrode current collector and the positive electrode active material layer can be formed using known materials, and both have known structures. The positive electrode current collector is formed using, for example, a foil or porous material made of stainless steel, aluminum, or the like. The positive electrode active material layer is formed by applying a positive electrode alloy slurry containing a positive electrode active material such as lithium cobalt oxide or lithium iron phosphate, a binding material, and a dispersant to the surface of the positive electrode current collector and then drying and rolling the coating film.

A negative electrode plate has a negative electrode current collector and a negative electrode active material layer. The negative electrode active material layer is stacked on both sides or one side of the negative electrode current collector. Both the negative electrode current collector and the negative electrode active material layer can be formed using known materials, and both have known structures. The negative electrode current collector is formed using, for example, a foil or porous material made of copper, aluminum, or the like. The negative electrode active material layer is formed by applying a negative electrode alloy slurry containing a negative electrode active material such as graphite, a binding material, and a dispersant, and then drying and rolling the coating film.

Examples shown as the separators 5 include an adhesive separator shown in FIG. 3A and a heat-resistant adhesive separator shown in FIG. 3B. The adhesive separator consists of a base material 14 and an adhesive layer 16. The base material 14 is a resin sheet made of polyolefin such as polyethylene (PE) and polypropylene (PP). The adhesive layer 16 is made of polymethyl methacrylate resin (PMMA), polyvinylidene fluoride resin (PVDF), or the like and is stacked on the main surfaces on both sides of the base material 14. The adhesive layer 16 may be stacked only on a main surface on one side of the base material 14. The adhesive forming the adhesive layer 16 may be applied to the entire main surface of the base material 14 or may be applied locally, for example, in the form of dots.

The heat-resistant adhesive separator consists of a base material 14, an adhesive layer 16, and a heat-resistant agent layer 18. The base material 14 and adhesive layer 16 are as described above. The heat-resistant agent layer 18 is a layer with heat resistance that is at least higher than that of the base material 14 and includes, for example, bae-mite, magnesium oxide, barium sulfate, aramid, and the like. The heat-resistant agent layer 18 is interposed between the base material 14 and the adhesive layer 16. In other words, the heat-resistant agent layer 18 is stacked on one or both main surfaces of the base material 14, and the adhesive layer 16 is stacked on top of the heat-resistant agent layer 18.

The first electrode plate 8 is bonded to the adhesive layer 16 of the first separator 6 and the adhesive layer 16 of the second separator 10. The second electrode plate 12 is bonded to the adhesive layer 16 of the second separator 10. The adhesive layer 16 exhibits adhesive strength when heated to a predetermined set temperature and holds the electrode plate 7. When the adhesive layer 16 to which the electrode plate 7 is bonded is heated to the set temperature or more, the adhesive strength decreases, and the holding of the electrode plate 7 is released. For example, when the adhesive layer 16 is heated to a temperature equal to the glass transition point or above, the resin forming the adhesive layer 16 melts, and the adhesive strength decreases. Further, the adhesive layer 16 can keep a state where the electrode plate 7 is connected to the separator 5 at room temperature (e.g., 20-25 degrees Celsius).

In a production line for the multilayer electrode body 100, a plurality of unit multilayer bodies 2 are conveyed while being connected by a strip-shaped separator continuous body 22 in the form of a continuous multilayer body 20. Being cut by a cutter 23, the separator continuous body 22 is divided into a plurality of individual unit multilayer bodies 2. At this time, the separator continuous body 22 is cut between adjacent electrode plates 7 in the conveyance direction of the continuous multilayer body 20. The separator continuous body 22 that has been cut becomes a separator 5 in a unit multilayer body 2. The individual unit multilayer bodies 2 that have been divided are conveyed by conveyance unit 24 toward the production device 1. The conveyance unit 24 includes, for example, a suction head that sucks and holds a unit multilayer body 2 by air suction through a suction hole.

The unit multilayer body 2 is inspected for the position thereof with respect to the conveyance unit 24 before reaching the production device 1 for the multilayer electrode body 100. This position inspection is referred to as the first position inspection. In the first position inspection, an image of the unit multilayer body 2 is taken by a camera 28 while the unit multilayer body 2 is being irradiated with light of a predetermined wavelength from an illumination device 26. The image taken by the camera 28 is sent to a control device 30. The control device 30 has a detection unit 32 that performs the first position inspection. The detection unit 32 performs a predetermined image process to the image obtained from the camera 28 so as to detect the position of the unit multilayer body 2 with respect to the conveyor unit 24.

The control device 30 is implemented in hardware such as elements or circuits such as a CPU and memory of a computer, and in software such as a computer program. FIG. 1 depicts functional blocks implemented by the cooperation of the hardware and the software. Therefore, it will be obvious to those skilled in the art that the functional blocks may be implemented in a variety of manners by a combination of hardware and software.

The unit multilayer body 2 that has undergone the first position inspection is conveyed by the conveyance unit 24 to the production device 1 for the multilayer electrode body 100. The production device 1 for the multilayer electrode body 100 includes a stacking stage 4, a conveyance unit 24, and an inspection device 34. The operation of each part of the production device 1 is controlled by the control device 30. Therefore, it can be interpreted that the control device 30 constitutes a part of the production device 1.

When the conveyance unit 24 reaches a stacking position facing the stacking stage 4, the conveyance unit 24 stops suctioning air from the suction hole and releases the unit multilayer body 2 onto the stacking stage 4. The driving of the conveyance unit 24 is controlled by a conveyance control unit 36 of the control device 30. As unit multilayer bodies 2 are sequentially released from a plurality of conveyance units 24, the unit multilayer bodies 2 are stacked on the stacking stage 4.

The stacking stage 4 can be driven in X-axis and Y-axis directions, which are orthogonal to each other. Further, the stacking stage 4 can be driven in a Z-axis direction, which is orthogonal to the X-axis and Y-axis directions. Furthermore, the stacking stage 4 is rotatable around the Z-axis direction. The X-axis and Y-axis directions are horizontal directions, and the Z-axis direction is a vertical direction. The driving of the stacking stage 4 is controlled by a stage control unit 38 of the control device 30. When a unit multilayer body 2 is released from a conveyance unit 24, the stage control unit 38 adjusts the position of the stacking stage 4 with respect to the unit multilayer body 2 located directly above the stacking stage 4 based on position information of the unit multilayer body 2 obtained in the first position inspection. This allows the misalignment of the suction position of the unit multilayer body 2 in the conveyance unit 24 to be corrected and thus allows the unit multilayer body 2 to be stacked on the stacking stage 4 with high positional accuracy.

When a unit multilayer body 2 is released from a conveyance unit 24 onto the stacking stage 4, the position of the unit multilayer body 2 placed on the stacking stage 4 is inspected by the inspection device 34. The inspection device 34 inspects the position of an electrode plate 7 in the multilayer body 2 from the separator 5 side. In the present embodiment, the position of the first electrode plate 8 is inspected through the first separator 6.

The inspection device 34 includes an infrared light irradiation unit 40, a camera 42, a mirror 44, and a detection unit 32. The infrared light irradiation unit 40 irradiates the multilayer body 2 from the separator 5 side with infrared light IR (far-infrared ray) that has a peak wavelength within the range of from 6.5 μm to 9.6 μm. This infrared light IR is an electromagnetic wave that transmits through the separator 5 (transmits through the separator 5 at a predetermined transmission rate or higher) but does not transmit through the electrode plate 7 (transmits through the electrode plate 7 at less than a predetermined transmission rate). The transmittance of the infrared light IR to the separator 5 is, for example, 50 percent or more. The transmittance of the infrared light IR to the electrode plate 7 is, for example, less than 50 percent. The irradiation time of the infrared light IR to each unit multilayer body 2 is, for example, one second or less.

The camera 42 has a sensitivity within the wavelength range of the infrared light IR and takes an image of the infrared light IR that transmits through the separator 5 and is reflected by the electrode plate 7. The camera 42 preferably has a germanium lens at an entrance for the infrared light IR. A germanium lens has high transmittance for infrared light IR and thus can efficiently take an image of the electrode plate 7. Further, since the wavelength of the infrared light IR according to the present embodiment is 6 μm or longer, a chalcogenide glass lens that has high transmittance just like a germanium lens can also be used.

Figure 4A:
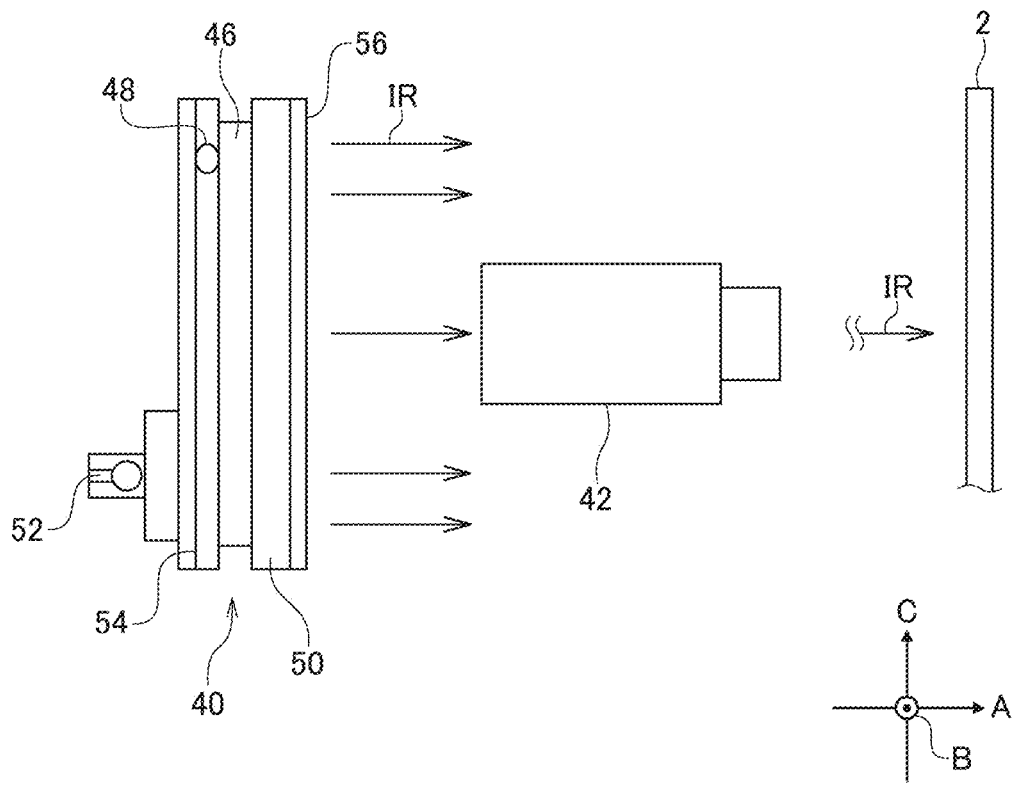
FIG. 4A is a schematic diagram of an infrared light irradiation unit and a camera viewed from a second direction.
Figure 4B:
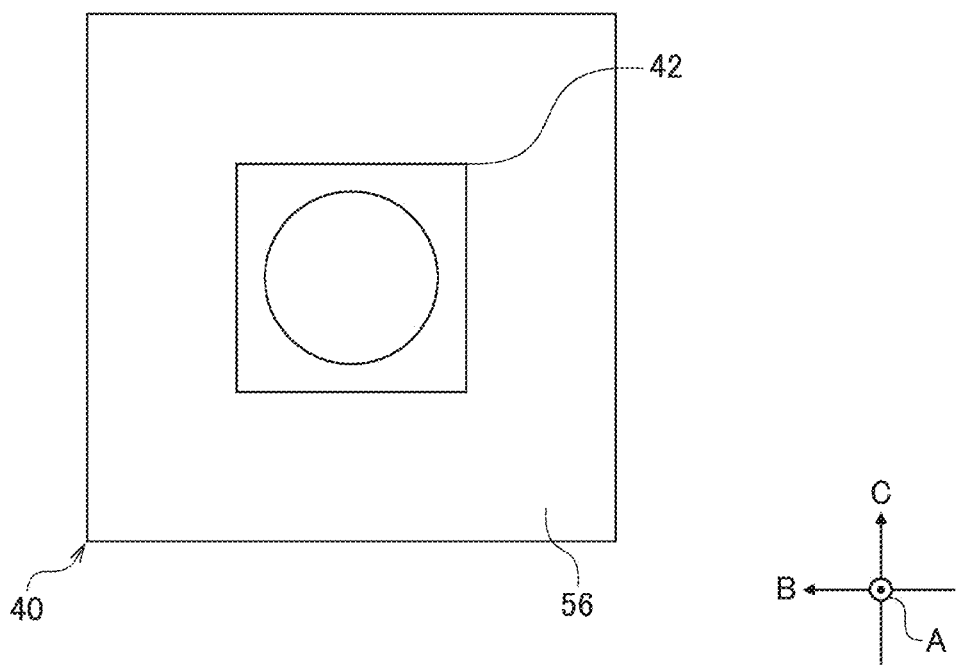
FIG. 4B is a schematic diagram of the infrared light irradiation unit and the camera viewed from a first direction.

FIG. 4A is a schematic diagram of the infrared light irradiation unit 40 and the camera 42 viewed from a second direction B. FIG. 4B is a schematic diagram of the infrared light irradiation unit 40 and the camera 42 viewed from a first direction A. The orientation of the infrared light irradiation unit 40 according to the present embodiment is set to radiate infrared light IR horizontally. Further, the infrared light irradiation unit 40 and the camera 42 are arranged horizontally. Hereafter, the direction in which the infrared light irradiation unit 40 and the camera 42 are aligned is referred to as the first direction A, and the horizontal direction orthogonal to the first direction A is referred to as the second direction B. The vertical direction orthogonal to the first direction A and the second direction B is referred to as a third direction C.

The infrared light irradiation unit 40 has a heat source 46, a thermocouple 48, a metal plate 50, a mounting bracket 52, and a heat insulating plate 54. A rubber heater or the like can be used as the heat source 46. The thermocouple 48 controls the output of heat source 46. One of the main surfaces of the metal plate 50 is fixed to the heat source 46 in a heat conductive manner, and the metal plate 50 uniformly transfers heat generated by the heat source 46. The metal plate 50 is composed of, for example, a copper plate. The other main surface of the metal plate 50 constitutes an infrared light irradiation surface 56. The infrared light irradiation surface 56 is coated with a black body in order to suppress unnecessary radiation and reflection of infrared light IR.

The mounting bracket 52 is provided on the opposite side of metal plate 50 across heat source 46 and is connected to an external support mechanism. The heat insulating plate 54 is made of, for example, a bake plate and is arranged between the heat source 46 and the mounting bracket 52. The heat insulating plate 54 suppresses heat transfer from the heat source 46 to the mounting bracket 52 side.

The camera 42 is arranged between the infrared light irradiation unit 40 and a unit multilayer body 2 on the optical path of infrared light IR. In other words, the camera 42 is arranged in front of the infrared light irradiation surface 56 in the direction of irradiation with infrared light IR. The infrared light irradiation unit 40 and the camera 42 are arranged such that the infrared light irradiation axis of the infrared light irradiation unit 40 and the optical axis of the camera 42 extend parallel to each other. The infrared light irradiation unit 40 has an infrared light irradiation surface 56 that extends outward of the camera 42 when viewed from the first direction A in which the camera 42 and the infrared light irradiation unit 40 are aligned. Therefore, in the infrared light irradiation surface 56, although infrared light IR emitted from an area overlapping the camera 42 is blocked from proceeding to the unit multilayer body 2 by the camera 42, infrared light IR emitted from an area surrounding the camera 42 can proceed to the unit multilayer body 2 side.

A mirror 44 is arranged downstream of the camera 42 in the optical path of the infrared light IR, and the infrared light IR is reflected by the mirror 44 toward the unit multilayer body 2. As a result, infrared light IR emitted horizontally from the infrared light irradiation unit 40 progresses toward the unit multilayer body 2 placed on the stacking stage 4. The mirror 44 is preferably gold coated on the reflective surface. This increases the reflectivity of infrared light IR and allows the electrode plate 7 to be imaged efficiently.

Infrared light IR is emitted from the separator 5 side to the unit multilayer body 2, transmits through the separator 5, and reaches the electrode plate 7. The infrared light IR that has reached the electrode plate 7 is reflected by the electrode plate 7, transmits through the separator 5 again, and is then reflected by the mirror 44 so as to become incident on the camera 42. As a result, an image of the unit multilayer body 2 is taken by the camera 42. If the orientation of the infrared light irradiation unit 40 is set such that the infrared light irradiation unit 40 can directly irradiate the unit multilayer body 2 with infrared light IR, the mirror 44 can be omitted.

The camera 42 sends captured image information to the detection unit 32. The detection unit 32 detects the position of the electrode plate 7 based on the image taken by the camera 42. This position inspection is referred to as the second position inspection. With regard to the second position inspection, the detection unit 32 stores reference position information of the electrode plate 7 and a threshold value for the amount of deviation from the reference position in advance. The reference position information is, for example, position information of two predetermined corners of the electrode plate 7. Upon acquiring an image from the camera 42, the detection unit 32 checks the respective positions of the two corners in the image against reference positions. If the amount of deviation of the two corners from the respective reference positions is greater than the threshold value, the detection unit 32 determines that the stacking position of the unit multilayer body 2 is non-conforming.

The detection unit 32 sends this determination result to the conveyance control unit 36. Upon receiving the determination result from the detection unit 32, the conveyance control unit 36 controls the conveyance unit 24 so as to suction again a unit multilayer body 2 determined to be non-conforming and remove the unit multilayer body 2 from the stacking stage 4. The conveyance control unit 36 then controls the conveyance unit 24 such that the removed unit multilayer body 2 is stacked again or discharged out of the line.

In the present embodiment, the detection unit 32 performs both the first and second position inspections. Alternatively, the first and second position inspections may be performed by separate detection units. Further, the detection unit 32 that performs the second position inspection may be independent of the control device 30 that controls each part of the production device 1. The infrared light irradiation unit 40 and the camera 42 may be used for the first position inspection.

By setting the range of the peak wavelength of infrared light IR from 6.5 µm to 9.6 µm, temperature rise of the unit multilayer body 2 due to irradiation with infrared light IR can be suppressed to 50 degrees Celsius or less and more preferably to 40 degrees Celsius or less. This makes it possible to take an image of the electrode plate 7 through the separator 5 while suppressing the decrease in adhesive strength of the adhesive layer 16.

As explained above, the inspection device 34 according to the present embodiment is a device that inspects the position of the electrode plate 7 in the multilayer body of the separator 5 and the electrode plate 7 from the separator 5 side and is provided with: an infrared light irradiation unit 40 that irradiates a unit multilayer body 2 from the separator 5 side with infrared light IR that has a peak wavelength within the range of from 6.5 µm to 9.6 µm; a camera 42 that has a sensitivity within the wavelength range of the infrared light IR and takes an image of the infrared light IR that transmits through the separator 5 and is reflected by the electrode plate 7; and a detection unit 32 that detects the position of the electrode plate 7 based on the image taken by the camera 42.

As described, by irradiating the unit multilayer body 2 with infrared IR of a specific wavelength so as to detect the position of the electrode plate 7, it is possible to suppress the temperature of the adhesive layer 16 from rising to a temperature at which the adhesive strength decreases. This makes it possible to inspect the position of the electrode plate 7 through the separator 5 while maintaining the state of adhesion between the separator 5 and the electrode plate 7.

Further, the production device 1 of the multilayer electrode body 100 according to the present embodiment includes: a stacking stage 4 on which a unit multilayer body 2 in which a separator 5 and an electrode plate 7 are bonded with an adhesive is stacked; a conveyance unit 24 that conveys the unit multilayer body 2 and releases the multilayer body 2 onto the stacking stage 4; and an inspection device 34 that inspects the position of the electrode plate 7 in the unit multilayer body 2 released from the conveyance unit 24. This allows the quality of the multilayer electrode body 100 to be improved, thereby achieving both capacity enlargement and safety of the secondary battery.

In the inspection device 34 according to the present embodiment, the camera 42 is arranged between the infrared light irradiation unit 40 and a unit multilayer body 2 on the optical path of the infrared light IR. Further, the infrared light irradiation unit 40 has an infrared light irradiation surface 56 that extends outward of the camera 42 when viewed from the first direction A in which the camera 42 and the infrared light irradiation unit 40 are aligned. This allows for an increase in the efficiency of incidence on the camera 42 of the infrared light IR reflected by the electrode plate 7, allowing for the acquisition of a higher contrast image. As a result of this, the position of the electrode plate 7 can be inspected with higher accuracy.

Second Embodiment

Figure 5A:
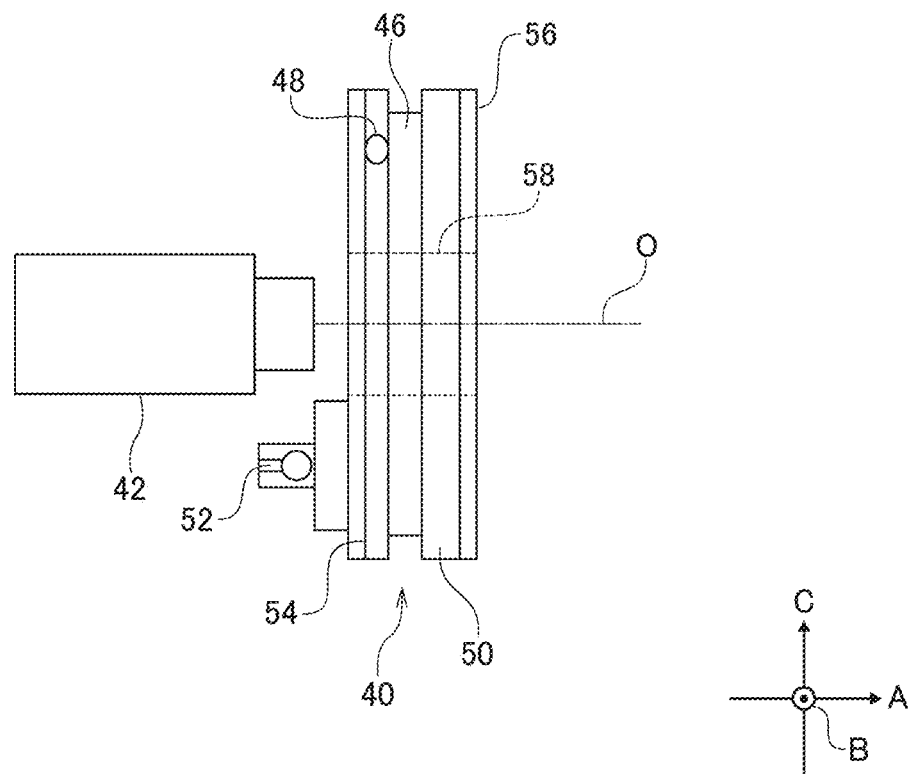
FIG. 5A is a schematic diagram of an infrared light irradiation unit and a camera viewed from a second direction that are provided in an inspection device according to the second embodiment.
Figure 5B:
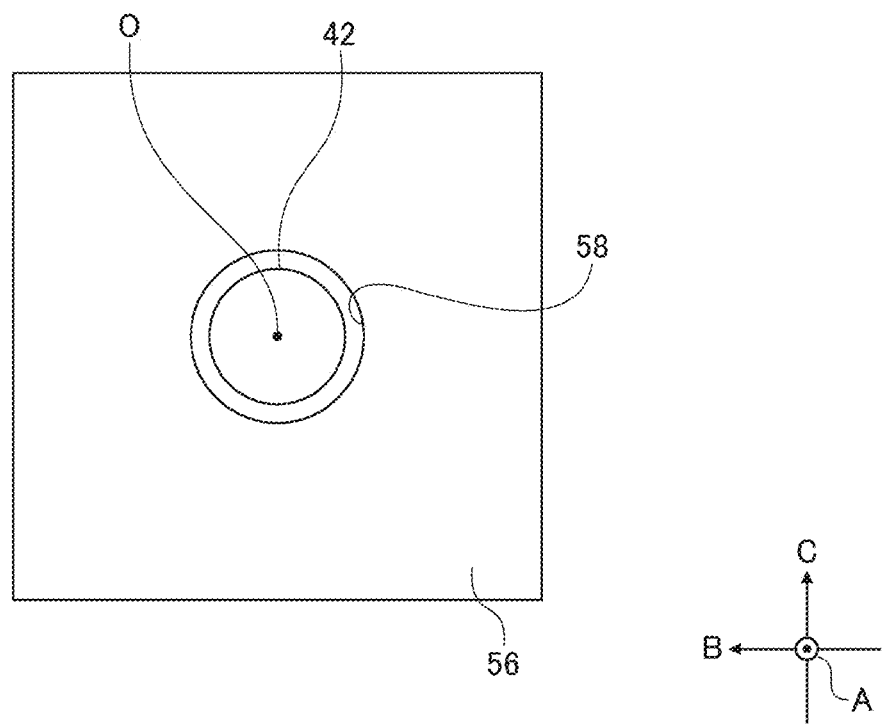
FIG. 5B is a schematic diagram of the infrared light irradiation unit and the camera viewed from a first direction.

The second embodiment shares a common structure with the first embodiment except for the shape of an infrared light irradiation unit 40 and the arrangement of the infrared light irradiation unit 40 and the camera 42. Hereinafter, an explanation will be given mainly on structures different from those of the first embodiment, and the common structure will be briefly described or omitted. FIG. 5A is a schematic diagram of an infrared light irradiation unit 40 and a camera 42 viewed from a second direction B that are provided in an inspection device 34 according to the second embodiment. FIG. 5B is a schematic diagram of the infrared light irradiation unit 40 and the camera 42 viewed from a first direction A.

Just like the infrared light irradiation unit 40 explained in the first embodiment, the infrared light irradiation unit 40 according to the present embodiment has a heat source 46, a thermocouple 48, a metal plate 50, a mounting bracket 52, a heat insulating plate 54, and an infrared light irradiation surface 56. The infrared light irradiation surface 56 has a through hole 58. In the present embodiment, the through hole 58 penetrates the entire infrared light irradiation unit 40 in the first direction A from the infrared light irradiation surface 56 to the heat insulating plate 54. Further, the infrared light irradiation unit 40 and the camera 42 are arranged such that the through hole 58 and the optical axis O of the camera 42 overlap each other when viewed from the first direction A in which the infrared light irradiation unit 40 and the camera 42 are aligned.

This allows for an increase in the efficiency of incidence on the camera 42 of the infrared light IR reflected by the electrode plate 7, and higher contrast images can thus be obtained. As a result of this, the position of the electrode plate 7 can be inspected with higher accuracy. The camera 42 may be arranged on the rear side of the infrared light irradiation unit 40, the infrared light irradiation unit 40 may be arranged on the rear side of the camera 42, or at least a part of the camera 42 may be arranged inside the through hole 58. When the infrared light irradiation unit 40 is arranged on the rear side of the camera 42, by bringing the through hole 58 and the optical axis O to be overlapped, the amount of the infrared light IR that is blocked from progressing by the camera 42 can be reduced, thereby increasing the utilization efficiency of the infrared light IR.

Third Embodiment

Figure 6A:
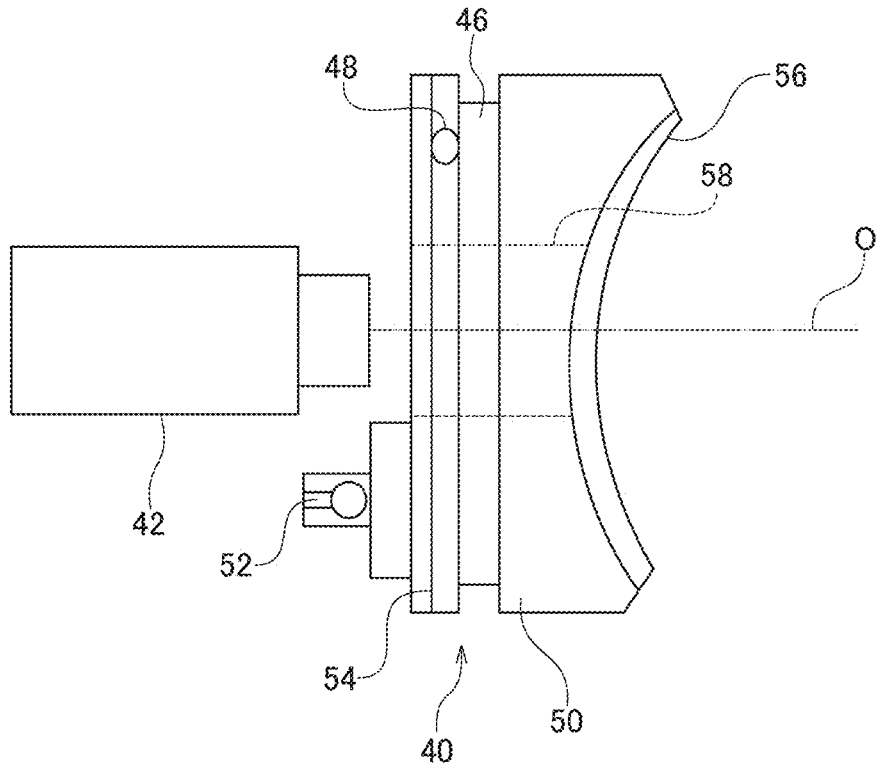
FIG. 6A is a schematic diagram of an infrared light irradiation unit and a camera viewed from a second direction that are provided in an inspection device according to the third embodiment.
Figure 6B:
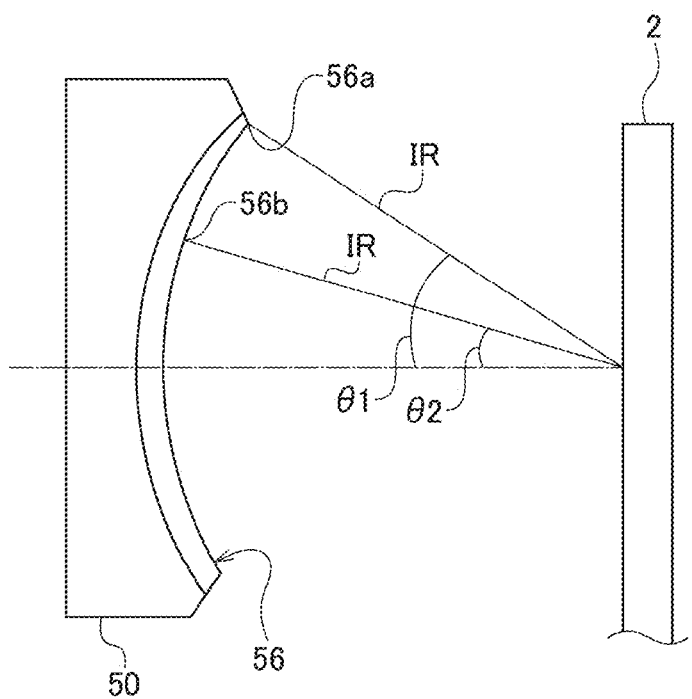
FIG. 6B is a schematic diagram showing an enlarged infrared light irradiation surface.

The third embodiment shares a common structure with the first or second embodiment except for the shape of an infrared light irradiation unit 40. Hereinafter, an explanation will be given mainly on structures different from those of the first embodiment, and the common structure will be briefly described or omitted. FIG. 6A is a schematic diagram of an infrared light irradiation unit 40 and a camera 43 viewed from a second direction B that are provided in an inspection device 34 according to the third embodiment. FIG. 6B is a schematic diagram showing an enlarged infrared light irradiation surface 56.

Just like the infrared light irradiation unit 40 explained in the first embodiment, the infrared light irradiation unit 40 according to the present embodiment has a heat source 46, a thermocouple 48, a metal plate 50, a mounting bracket 52, a heat insulating plate 54, and an infrared light irradiation surface 56. Just like the infrared light irradiation surface 56 explained in the second embodiment, the infrared light irradiation surface 56 has a through hole 58. The through hole 58 penetrates the entire infrared light irradiation unit 40 in the first direction A from the infrared light irradiation surface 56 to the heat insulating plate 54. The infrared light irradiation unit 40 and the camera 42 are arranged such that the through hole 58 and the optical axis O of the camera 42 overlap each other when viewed from the first direction A in which the infrared light irradiation unit 40 and the camera 42 are aligned.

The infrared light irradiation surface 56 of the infrared light irradiation unit 40 according to the present embodiment includes a first irradiation area 56a and a second irradiation area 56b. The first irradiation area 56a allows infrared light IR to be incident on a unit multilayer body 2 at a predetermined first incident angle θ1. The second irradiation area 56b allows infrared light IR to be incident on a unit multilayer body 2 at a second incident angle θ2 different from the first incident angle θ1.

As an example of the infrared light irradiation surface 56 including the first irradiation area 56a and the second irradiation area 56b, the infrared light irradiation unit 40 has a parabolic (paraboloidal) shaped infrared light irradiation surface 56. In this case, the infrared light irradiation unit 40 is preferably arranged such that the focus of the parabolic surface is located near or overlaps the unit multilayer body 2. On the parabolic infrared light irradiation surface 56, infrared light IR emitted from the first irradiation area 56a located outside the infrared light irradiation surface 56 is incident on the unit multilayer body 2 at a predetermined first incidence angle of θ1. On the other hand, infrared light IR emitted from the second irradiation area 56b located closer to the center of the infrared light irradiation surface 56 than the first irradiation area 56a is incident on the unit multilayer body 2 at a second incidence angle of θ2 smaller than the first incidence angle of θ1.

As described, by causing infrared light IR emitted from the infrared light irradiation surface 56 to be incident on the unit multilayer body 2 at a plurality of incidence angles, the efficiency of incidence on the camera 42 of the infrared light IR reflected by the electrode plate 7 can be increased, and higher contrast images can thus be obtained. As a result of this, the position of the electrode plate 7 can be inspected with higher accuracy. Contrast enhancing of an image by causing infrared light IR to be incident on the unit multilayer body 2 at a plurality of incidence angles and contrast enhancing of an image by bringing the through hole 58 and the optical axis O to overlap each other when viewed from the first direction A can be performed independently of each other.

Fourth Embodiment

Figure 7:
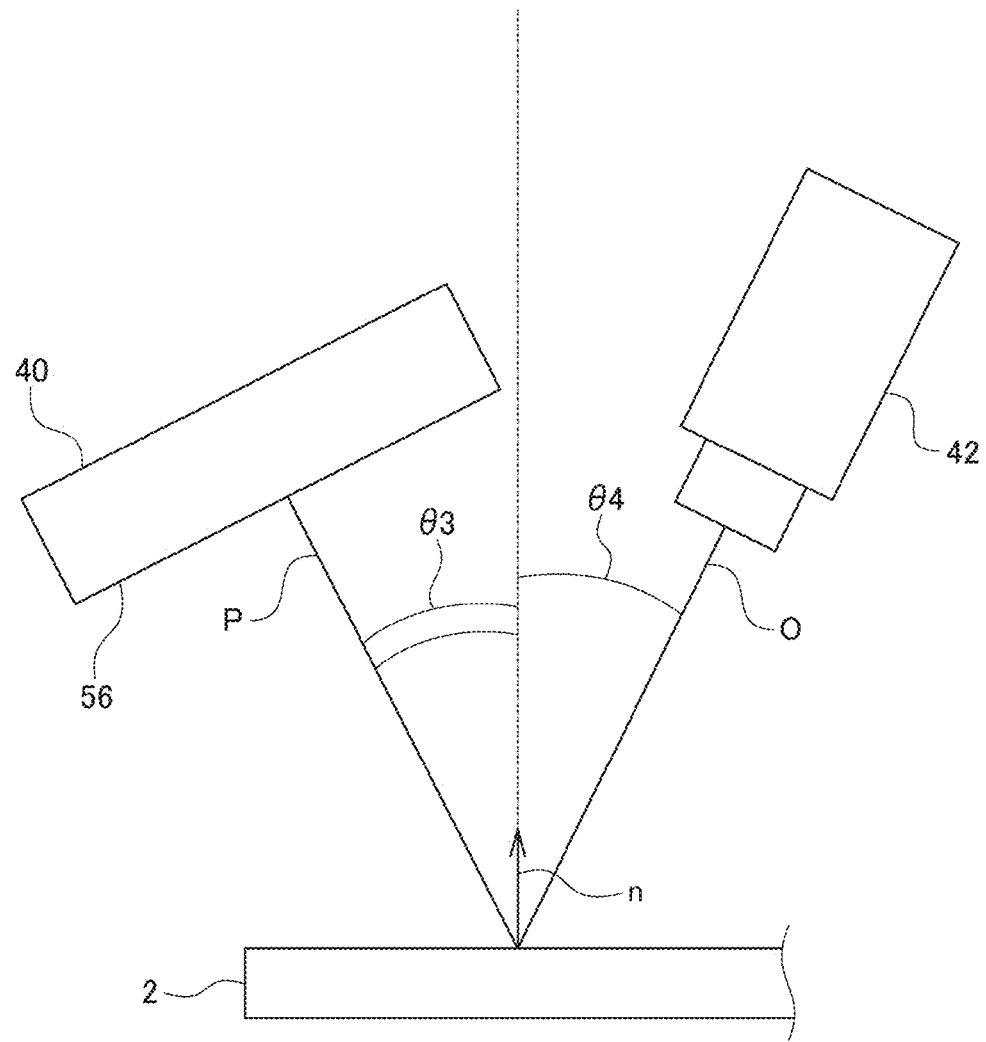
FIG. 7 is a schematic diagram of an infrared light irradiation unit and a camera that are provided in an inspection device according to the fourth embodiment.

The fourth embodiment shares a common structure with the first embodiment except for the arrangement of the infrared light irradiation unit 40 and the camera 44. Hereinafter, an explanation will be given mainly on structures different from those of the first embodiment, and the common structure will be briefly described or omitted. FIG. 7 is a schematic diagram of an infrared light irradiation unit 40 and a camera 42 that are provided in an inspection device 34 according to the fourth embodiment.

Just like the infrared light irradiation unit 40 explained in the first embodiment, the infrared light irradiation unit 40 according to the present embodiment has a heat source 46, a thermocouple 48, a metal plate 50, a mounting bracket 52, a heat insulating plate 54, and an infrared light irradiation surface 56. Further, the infrared light irradiation surface 56 according to the present embodiment has a central axis P inclined with respect to a normal line n of the unit multilayer body 2. The central axis P is, for example, a virtual straight line extending to the unit multilayer body 2 side from the geometric center of the contour shape of the infrared light irradiation surface 56 viewed from the unit multilayer body 2 side. The camera 42 is arranged such that the optical axis O is inclined with respect to the normal line n of the unit multilayer body 2.

In the example shown in FIG. 7, the central axis P of the infrared light irradiation surface 56 is inclined from the normal line n by an angle of θ3. The optical axis O of the camera 42 is inclined from the normal line n by an angle of θ4. The angles θ3 and θ4 may be the same or different. Preferably, the central axis P and the optical axis O are inclined in directions opposite to each other with respect to the normal line n. In other words, the direction in which the central axis P is inclined and the direction in which the optical axis O is inclined are offset by 180 degrees around the normal line n.

Such arrangement of the infrared light irradiation surface 56 and the camera 42 allows for an increase in the efficiency of incidence on the camera 42 of the infrared light IR reflected by the electrode plate 7, allowing for the acquisition of a higher contrast image. As a result of this, the position of the electrode plate 7 can be inspected with higher accuracy.

Described above is a detailed explanation on the embodiments of the present disclosure. The above-described embodiments merely show specific examples for carrying out the present disclosure. The details of the embodiments do not limit the technical scope of the present disclosure, and many design modifications such as change, addition, deletion, etc., of the constituent elements may be made without departing from the spirit of the present disclosure defined in the claims. New embodiments resulting from added design change will provide the advantages of the embodiments and variations that are combined. In the above-described embodiments, the details for which such design change is possible are emphasized with the notations "according to the embodiment", "in the embodiment", etc. However, design change is also allowed for those without such notations. Optional combinations of the above constituting elements are also valid as embodiments of the present disclosure. Hatching applied to a cross section of a drawing does not limit the material of an object to which the hatching is applied.

The inventions according to the above-described embodiments may be defined by the items described in the following.

[Item 1]

An inspection method for inspecting the position of an electrode plate (7) in a multilayer body (2), which is obtained by bonding a separator (5) and the electrode plate (7) to each other by means of an adhesive, from the separator (5) side, including irradiating the multilayer body (2) from the separator (5) side with infrared light (IR) that has a peak wavelength within the range of from 6.5 μm to 9.6 μm;

by means of a camera (42) that has a sensitivity within the wavelength range of the infrared light (IR), taking an image of the infrared light (IR) that transmits through the separator (5) and is reflected by the electrode plate (7); and detecting the position of the electrode plate (7) based on the image taken by the camera (42).

Exemplary Embodiments

Hereinafter, exemplary embodiments of the present invention will be explained. However, the exemplary embodiments are merely examples for suitably explaining the present invention and do not limit the present invention in any way.

[Verification Test I: Verification of Infrared Light Wavelength Range]

The influence of the peak wavelength of infrared light IR on both image taking performed by the camera and the state of the unit multilayer body was verified through Verification Test I.

Figure 8:
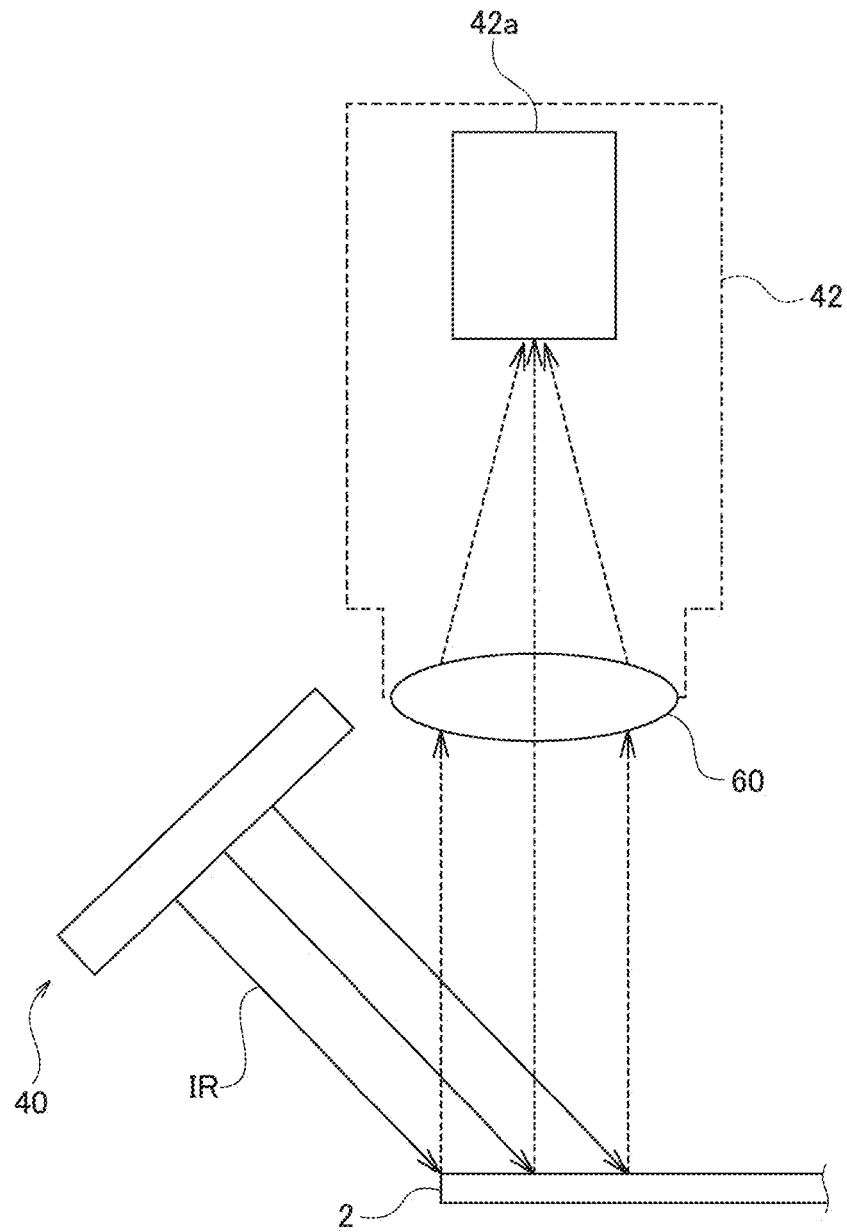
FIG. 8 is a schematic diagram of an inspection device used in Verification Test I.

FIG. 8 is a schematic diagram of an inspection device 34 used in Verification Test I. In this verification test, a camera 42 was arranged directly above a unit multilayer body 2. The camera 42 had an imaging element 42a and a condenser lens 60. The condenser lens 60 was arranged between the unit multilayer body 2 and the imaging element 42a. The infrared light irradiation unit 40 was arranged so as to irradiate the unit multilayer body 2 with infrared IR at an angle. The structure of the infrared light irradiation unit 40 is the same as the infrared light irradiation unit 40 of the inspection device 34 according to the first embodiment (see FIG. 4A). Further, a unit multilayer body 2 with a first electrode plate 8 (negative electrode plate) sandwiched between a first separator 6 and a second separator 10 was used. For each separator 5, a heat-resistant adhesive separator was used that had a base material 14 made of PE, a heat-resistant agent layer 18 made of magnesium oxide and stacked on both sides of the base material 14, and an adhesive layer 16 made of PVDF and stacked on each heat-resistant agent layer 18. Each separator 5 and the first electrode plate 8 were heated to 50 degrees Celsius so as to be press-bonded.

Under the condition of a room temperature of 26 degrees Celsius, the unit multilayer body 2 was irradiated with infrared light IR of various peak wavelengths from the infrared light irradiation unit 40 for one second, and an image of the unit multilayer body 2 was taken by the camera 42. The infrared light IR reaching the unit multilayer body 2 transmitted through the first separator 6 and was reflected by the first electrode plate 8. The infrared light IR reflected by the first electrode plate 8 transmitted through the condenser lens 60 and was imaged by the imaging element 42a. The peak wavelengths of infrared light IR were set to be 6.5 µm, 8.7 µm, 8.9 µm, 9.0 µm, 9.2 µm, 9.3 µm, and 9.6 µm. The surface temperature of the unit multilayer body 2 obtained one second after the irradiation with the infrared light IR was measured using a contact thermometer. The temperature of the infrared light irradiation surface 56 was measured using a digital thermometer with a thermocouple affixed to the surface of the infrared light irradiation surface 56. Also, changes in the state of the unit multilayer body 2 including peeling of the separator and the like were visually checked.

FIG. 9 is a diagram showing the result of Verification Test I. As shown in FIG. 9, it has been confirmed that the position of the first electrode plate 8 can be inspected from the first separator 6 side when the unit multilayer body 2 is irradiated with infrared light IR with a peak wavelength of 6.5 µm to 9.6 µm. The surface temperature of the unit multilayer body 2 was 28.0 degrees Celsius or lower, which was sufficiently lower than 50 degrees Celsius, which is the adhesion temperature of the adhesive layer 16. As a matter of course, no peeling of a separator 5 was observed at any peak wavelength. From the above, it has been confirmed that position of the electrode plate 7 can be detected while suppressing a decrease in the adhesive strength of the separator 5 and the electrode plate 7 when the peak wavelength of infrared light IR is in the range of 6.5 µm to 9.6 µm.

Furthermore, the inventors of the present invention visually confirmed that the separator peeled off when the peak wavelength of infrared light IR was less than 6.5 µm or more than 9.6 µm. When the peak wavelength of infrared light IR is less than 6.5 µm, an increase in the temperature of the separator 5 due to irradiation with infrared light IR causes a decrease in the adhesive strength of the adhesive layer 16. Since the surface temperature of the separator 5 tends to increase as the wavelength of infrared light IR becomes shorter, the separator 5 is more likely to peel off when the peak wavelength is less than 6.5 µm.

On the other hand, an increase in the temperature of the separator 5 is suppressed when the peak wavelength of infrared light IR is more than 9.6 µm. However, due to the irradiation with infrared light IR, the electrode plate 7 is heated, and the adhesive strength of the adhesive layer 16 decreases due to the temperature increase of the electrode plate 7. When the infrared light IR reaches the electrode plate 7, electrons in the metal that makes up the electrode plate 7 vibrate and generate heat. This causes an increase in the temperature of the electrode plate 7. Since the electrode plate 7 is covered by the separator 5, heat tends to accumulate in the electrode plate 7, and the temperature of the electrode plate 7 rises in a relatively short period of time. Since the temperature of the electrode plate 7 tends to increase as the wavelength of infrared light IR becomes longer, the separator 5 is more likely to peel off when the peak wavelength is more than 9.6 µm.

[Verification Test II: Verification of Infrared Light Irradiation Unit and Camera]

The influence of the shape of the infrared light irradiation unit and the arrangement of the infrared light irradiation unit and the camera on the image taking performed by the camera was verified through Verification Test II.

Figure 10A:
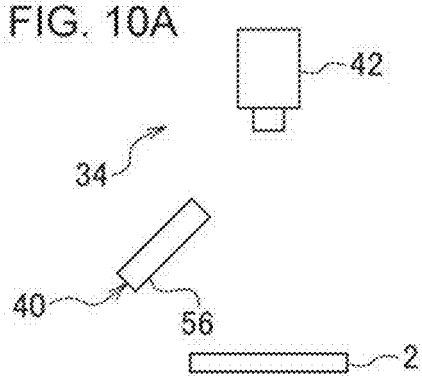
FIG. 10A is a schematic diagram of an inspection device according to the first exemplary embodiment.
Figure 10B:
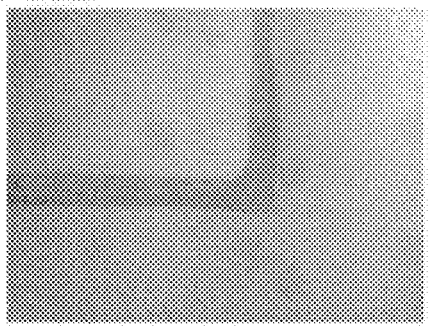
FIG. 10B is an image obtained by the inspection device according to the first exemplary embodiment.

FIG. 10A is a schematic diagram of the inspection device 34 according to the first exemplary embodiment. FIG. 10B is an image obtained by the inspection device 34 according to the first exemplary embodiment. The inspection device 34 according to the first exemplary embodiment is the same as the inspection device 34 used in Verification Test I (see FIG. 8).

Figure 10C:
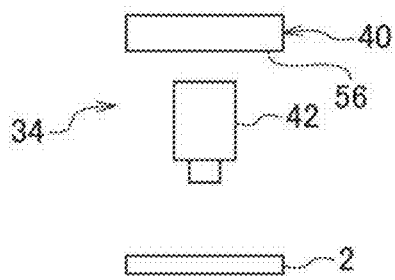
FIG. 10C is a schematic diagram of the inspection device according to the second exemplary embodiment.
Figure 10D:
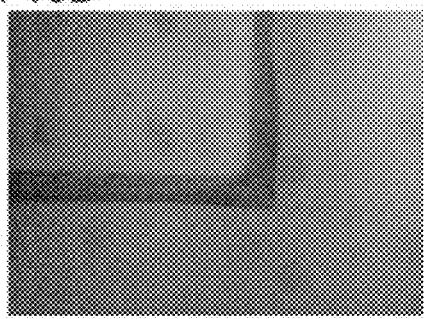
FIG. 10D is an image obtained by the inspection device according to the second exemplary embodiment.

FIG. 10C is a schematic diagram of the inspection device 34 according to the second exemplary embodiment. FIG. 10D is an image obtained by the inspection device 34 according to the second exemplary embodiment. The inspection device 34 according to the second exemplary embodiment is the same as the inspection device 34 explained in the first embodiment (see FIG. 4A).

Figure 10E:
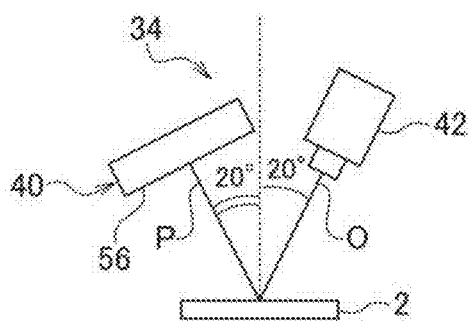
FIG. 10E is a schematic diagram of the inspection device according to the third exemplary embodiment.
Figure 10F:
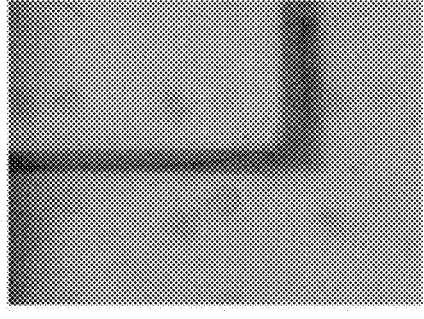
FIG. 10F is an image obtained by the inspection device according to the third exemplary embodiment.

FIG. 10E is a schematic diagram of the inspection device 34 according to the third exemplary embodiment. FIG. 10F is an image obtained by the inspection device 34 according to the third exemplary embodiment. The inspection device 34 according to the third exemplary embodiment is the same as the inspection device 34 explained in the fourth embodiment (see FIG. 7).

Figure 10G:
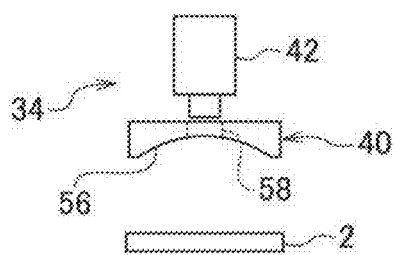
FIG. 10G is a schematic diagram of the inspection device according to the fourth exemplary embodiment.
Figure 10H:
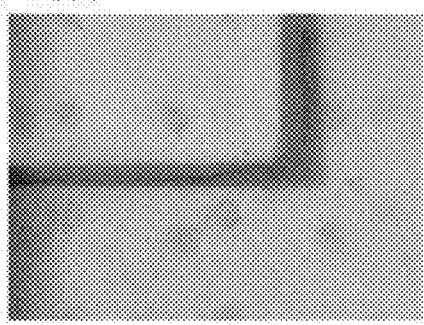
FIG. 10H is an image obtained by the inspection device according to the fourth exemplary embodiment.

FIG. 10G is a schematic diagram of the inspection device 34 according to the fourth exemplary embodiment. FIG. 10H is an image obtained by the inspection device 34 according to the fourth exemplary embodiment. The inspection device 34 according to the fourth exemplary embodiment is the same as the inspection device 34 explained in the third embodiment (see FIG. 6A).

In this evaluation test, the same unit multilayer body 2 as the one in the evaluation test I was used. Under the condition of a room temperature of 26 degrees Celsius, the unit multilayer body 2 was irradiated with infrared light IR of a peak wavelength of 9.35 µm from the infrared light irradiation unit 40 for one second, and an image of the unit multilayer body 2 was taken by the camera 42.

In the inspection device 34 according to the first exemplary embodiment, where the camera 42 was arranged directly above the unit multilayer body 2 and the unit multilayer body 2 was irradiated with infrared light IR at an angle, an image shown in FIG. 10B was obtained. On the other hand, in the inspection device 34 according to the second exemplary embodiment, where the camera 42 was arranged between the infrared light irradiation unit 40 and the unit multilayer body 2, an image whose contrast was higher than that in the inspection device 34 according to the first exemplary embodiment was obtained as shown in FIG. 10D. This makes it possible to distinguish more clearly between the separator 5 and the electrode plate 7. Based on the result of the second exemplary embodiment, it can be assumed that an image whose contrast is equal to or higher than that in the inspection device 34 according to the second exemplary embodiment can be obtained also by the inspection device 34 according to the second embodiment, i.e., the inspection device 34 in which the through hole 58 provided on the infrared light irradiation surface 56 and the optical axis O of the camera 42 are overlapped with each other.

Further, in the inspection device 34 according to the third exemplary embodiment, where the central axis P of the infrared light irradiation surface 56 and the optical axis O of the camera 42 were tilted, an image whose contrast was higher than that in the inspection device 34 according to the first exemplary embodiment and the inspection device 34 according to the second exemplary embodiment was obtained as shown in FIG. 10F. Further, in the inspection device 34 according to the fourth exemplary embodiment, which has a parabolic infrared light irradiation surface 56, an image whose contrast is equal to or higher than that in the inspection device 34 according to the third exemplary embodiment was obtained as shown in FIG. 10H.

From the above, it has been confirmed that the contrast of an image can be increased by irradiation with infrared light IR from the rear surface of the camera 42 and by overlapping the through hole 58 provided on the infrared light irradiation surface 56 and the optical axis O of the camera 42 with each other. Further, it has been confirmed that the contrast of an image can be increased by tilting the central axis P of the infrared light irradiation surface 56 and the optical axis O of the camera 42 with respect to the normal line n of the unit multilayer body 2. It has also been confirmed that the contrast of an image can be increased by setting the incidence angle of infrared light IR emitted from the first irradiation area 56a of the infrared light irradiation surface 56 being incident on the unit multilayer body 2 to be different from the incidence angle of infrared light IR emitted from the second irradiation area 56b being incident on the unit multilayer body 2.

The invention claimed is:

1. An inspection device for inspecting the position of an electrode plate in a multilayer body, which is obtained by bonding a separator and the electrode plate to each other by means of an adhesive, from the separator side, comprising:
   an infrared light irradiation unit that irradiates the multilayer body from the separator side with infrared light that has a peak wavelength within the range of from 6.5 μm to 9.6 μm;
   a camera that has a sensitivity within the wavelength range of the infrared light and takes an image of the infrared light that transmits through the separator and is reflected by the electrode plate; and
   a detection unit that detects the position of the electrode plate based on the image taken by the camera.

2. The inspection device according to claim 1, wherein
   the infrared light irradiation unit has an infrared light irradiation surface;
   the infrared light irradiation surface has a through hole; and
   the infrared light irradiation unit and the camera are arranged such that the through hole and the optical axis of the camera overlap each other when viewed from a first direction in which the infrared light irradiation unit and the camera are aligned.

3. The inspection device according to claim 1, wherein
   the infrared light irradiation unit has an infrared light irradiation surface including a first irradiation area in which infrared light becomes incident on the multilayer body at a predetermined first incidence angle and a second irradiation area in which infrared light becomes incident on the multilayer body at a second incidence angle different from the first incidence angle.

4. The inspection device according to claim 3, wherein
   the infrared light irradiation unit has a parabolic infrared light irradiation surface.

5. The inspection device according to claim 1, wherein
   the infrared light irradiation unit has an infrared light irradiation surface whose central axis is inclined with respect to a normal line of the multilayer body; and
   the camera is arranged such that the optical axis is inclined with respect to the normal line.

6. The inspection device according to claim 1, wherein
   the camera is arranged between the infrared light irradiation unit and the multilayer body on an optical path of the infrared light, and
   the infrared light irradiation unit has an infrared light irradiation surface that extends outward of the camera when viewed from the first direction in which the camera and the infrared light irradiation unit are aligned.

7. A device for producing a multilayer electrode body, comprising:
   a stacking stage on which a multilayer body in which a separator and an electrode plate are bonded with an adhesive is stacked;
   a conveyance unit that conveys the multilayer body and releases the multilayer body onto the stacking stage; and
   an inspection device according to claim 1 that inspects the position of the electrode plate in the multilayer body released from the conveyance unit, wherein the device stacks the multilayer body so as to produce a multilayer electrode body.

8. An inspection method for inspecting the position of an electrode plate in a multilayer body, which is obtained by bonding a separator and the electrode plate to each other by means of an adhesive, from the separator side, comprising:
   irradiating the multilayer body from the separator side with infrared light that has a peak wavelength within the range of from 6.5 μm to 9.6 μm;
   by a camera that has a sensitivity within the wavelength range of the infrared light, taking an image of the infrared light that transmits through the separator and is reflected by the electrode plate; and
   detecting the position of the electrode plate based on the image taken by the camera.

* * * * *